Patented Mar. 21, 1933

1,902,280

UNITED STATES PATENT OFFICE

MAX HAGEDORN, OTTO REICHERT, AND EUGEN GÜHRING, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY

PROCESS OF MAKING MIXED CELLULOSE ESTERS AND CELLULOSE ETHER ESTERS

No Drawing. Application filed April 25, 1927, Serial No. 186,566, and in Germany May 1, 1926.

The present invention relates to new mixed cellulose esters and cellulose ether esters and to a process of preparing the same. The said new cellulose derivatives are obtainable by treating a compound of the group consisting of such cellulose esters and ethers as contain esterifiable hydroxyl groups with a compound of the group consisting of organic acid anhydrides, mixed anhydrides of organic acids, organic acid amides and organic acid esters in the presence of an organic solvent. If desired, the reaction may be carried out in the presence of a material which is capable of promoting the esterification, such as for instance pyridine.

Our new cellulose compounds are highly valuable in the manufacture of plastic masses, coatings, lacquers, film flowing dopes and artificial threads. They may be employed either alone or in mixture with other cellulose derivatives. Furthermore, any softening agent, pigment or filling material known in the art of cellulose plastics may be added.

Our new process is particularly useful in the further esterification of mono-esters, di-esters, mono-ethers, di-ethers and mixtures thereof. Owing to the presence of hydroxyl groups which have not yet been esterified or etherified, these compounds when dispersed in an organic medium, e. g., swollen or dissolved in an organic liquid or melt, react with the said derivatives of acids, whereby cellulose derivatives, particularly mixed cellulose esters and cellulose ether esters are produced which contain several different substituents.

The course of the reaction depends upon the nature of the reacting compounds and also upon the conditions of reaction.

We are aware that the reaction of mono- or diesters of cellulose with chlorides of higher fatty acids in the presence of pyridine is well-known. This reaction, however, requires an apparatus constructed of acid-proof material due to the highly corrosive action of hydrochloric acid. Since no hydrochloric acid is produced in our process, the apparatus may be constructed of less resistant and cheaper material.

In many cases the derivative of the acid used acts as a swelling agent or solvent, as in the case of said anhydrides and acid amides, for example, so that is suffices to dissolve the cellulose derivative in the molten anhydride or amide, whereupon the esterification occurs. It need not here be discussed whether in this operation of dissolution and simultaneous esterification a deep polymerization of the cellulose molecule occurs. The reaction products possess an enhanced solubility in organic solvents and the resulting solutions are of diminished viscosity and the products are therefore of high technical value.

If the reaction is carried out with a mixed acid anhydride different acid radicles can be introduced simultaneously into the cellulose molecule and in this manner various mixed esters and ether-esters of cellulose can be made. A mixed acid anhydride which can be used is, for example, lauric-myristic acid anhydride. When mixed acid anhydrides are used, well defined mixed esters of cellulose of constant composition are obtained whereas when mixtures of different acid chlorides are used as proposed in French Specification Nr. 581 160, the product always varies in composition.

We are aware that esterification of a cellulose which has been subjected to a pretreatment comprising a slight nitration has already been suggested. This process, which yields products of little technical value, is not claimed herein.

*Example 1.*—100 grams of cellulose acetate (containing 54 per cent. of combined acetic acid) are dissolved by boiling in a reflux apparatus in 1000 cc. of acetone to which have been added 60 cc. of pyridine and 200 grams of stearic acid anhydride dissolved in 200 cc. of benzene. The solvents and the excess of pyridine are separated by distillation. During this operation the esterification occurs. The residue from the distillation is freed from pyridine compounds, stearic acid and excess of stearic acid anhydride by boiling it with water and with alcohol. The cellulose-ester-acetate thus obtained contains 14 per cent. of combined stearic acid.

*Example 2.*—Cellulose acetate (containing 54 per cent. of combined acetic acid) is dissolved in twice its weight of molten stearic acid anhydride. The mass, freed from excess of stearic acid anhydride by boiling with benzine, needs no further purification. It consists of a cellulose stearate acetate having 28–30 per cent. of combined stearic acid. The compound dissolves very easily in cold benzene, ethyl acetate, chloroform and homologues thereof. On the other hand, it is soluble only in hot ethanol and methanol.

*Example 3.*—Ethyl cellulose (containing about 5 ethoxyl-groups per $2C_6H_{10}O_5$) is heated on the oil bath with twice its weight of myristic acid anhydride. At about 140° C. the ethyl cellulose passes gradually into solution, esterification occurring. After complete dissolution the mass is heated for another 30 minutes. The cooled mass is purified by precipitation from benzine and petroleum ether in the cold and by extraction with these solvents.

*Example 4.*—Ethyl cellulose (with 5 ethoxyl groups per $2C_6H_{10}O_5$) is introduced into 3 times its weight of molten benzamide at 130° C. The cellulose ether passes into solution within 3 minutes. After solidification the mass is extracted repeatedly with water until the said amide has been completely separated. Pure cellulose-ethyl-ether-benzoic acid-ester remains.

What we claim is:—

1. The process which comprises treating cellulose acetate which still contains esterifiable hydroxyl groups with stearic acid anhydride.

2. The process which comprises treating cellulose acetate which still contains esterifiable hydroxyl groups with stearic acid anhydride in the presence of pyridine.

3. The process which comprises treating a compound selected from the group consisting of cellulose esters and ethers which contain esterifiable hydroxyl groups with a compound selected from the group consisting of anhydrides of higher solid fatty acids, mixed higher solid fatty acid anhydrides and benzamide.

4. The process which comprises treating a compound selected from the group consisting of cellulose esters and ethers which contain esterifiable hydroxyl groups with a compound selected from the group consisting of anhydrides of higher solid fatty acids, mixed higher solid fatty acid anhydrides and benzamide, in the presence of pyridine.

In testimony whereof we have affixed our signatures.

MAX HAGEDORN.
OTTO REICHERT.
EUGEN GÜHRING.